(12) United States Patent
Sun et al.

(10) Patent No.: US 8,021,108 B2
(45) Date of Patent: Sep. 20, 2011

(54) EXHAUST FAN

(75) Inventors: Ming-Chih Sun, Taipei Hsien (TW);
Kai Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 545 days.

(21) Appl. No.: 12/252,371

(22) Filed: Oct. 16, 2008

(65) Prior Publication Data
US 2010/0044017 A1    Feb. 25, 2010

(30) Foreign Application Priority Data

Aug. 22, 2008    (CN) .......................... 2008 1 0304160

(51) Int. Cl.
*F01D 25/08*    (2006.01)
*F04D 29/58*    (2006.01)
(52) U.S. Cl. .......................... 415/177; 415/119; 165/121
(58) Field of Classification Search .................. 415/119, 415/175, 177, 178; 165/121
See application file for complete search history.

(56) References Cited

U.S. PATENT DOCUMENTS

| 5,203,164 | A | * | 4/1993 | Paulson | ....................... 60/226.1 |
| 5,378,265 | A | * | 1/1995 | Pearl | ................................ 95/219 |
| 6,099,609 | A | * | 8/2000 | Lira et al. | ........................ 55/400 |
| 6,277,176 | B1 | * | 8/2001 | Tang et al. | ....................... 95/270 |
| 2002/0197158 | A1 | * | 12/2002 | Hsu et al. | ........................... 416/5 |

FOREIGN PATENT DOCUMENTS

JP    2006243206 A    9/2006

* cited by examiner

*Primary Examiner* — David Nhu
(74) *Attorney, Agent, or Firm* — Altis Law Group, Inc.

(57) ABSTRACT

An exhaust fan includes a fan frame, a fan, and a shielding plate. The fan frame defines a hollow shell, the hollow shell defines an air flow passage with an air inlet and an air outlet. The fan is received in the hollow shell, the fan includes a hub and a plurality of fan blades extending outward in a radial direction from circumference of the hub. The shielding plate is disposed at the air inlet side of the hub and covers an end surface of the hub facing the air inlet side. The shielding plate is separated from the hub.

20 Claims, 4 Drawing Sheets

EXHAUST FAN

CROSS-REFERENCE TO RELATED APPLICATION

This application claims all benefits accruing under 35 U.S.C. §119 from China Patent Application No. 200810304160.X, filed on 2008 Aug. 22, in the China Intellectual Property Office, the disclosure of which is incorporated herein by reference.

TECHNICAL FIELD

The present invention relates to fan assemblies and, particularly, to an exhaust fan with improved heat-resist ability.

DESCRIPTION OF THE RELATED ART

Due to increasing of heat generated from electronic devices and reduction of sizes thereof, the density of generated heat in these devices increases quickly. As a result, performance and reliability of the electronic devices will be influenced if heat dissipation is not effectively provided and the life span of the electronic devices may even be shortened. Hence, how to discharge the increasing heat effectively is a great challenge to in related fields.

A typical exhaust fan for an electronic device includes a fan frame and a fan. The fan frame forms a hollow shell receiving the fan therein. The hollow shell defines a flow passage with an inlet and an outlet at lateral sides of the fan frame correspondingly. The fan has a hub with a motor received therein and fan blades extending outward in a radial direction from the circumference of the hub. Because the exhaust fan is configured for drawing out air with high temperature in an electronic device and contacting with the air during operation, the hub thereof usually suffers high temperature, which may shorten the life of the motor received therein.

What is needed, therefore, is an exhaust fan with improved heat-resist ability to overcome the above-described problem.

BRIEF DESCRIPTION OF THE DRAWINGS

Many aspects of the present exhaust fan can be better understood with references to the accompanying drawings. The components in the drawing are not necessarily drawn to scale, the emphasis instead being placed upon clearly illustrating the principles of the present exhaust fan.

DETAILED DESCRIPTION OF THE EMBODIMENTS

Embodiments of the present invention will now be described in detail below, with references to the accompanying drawings.

Figure 1:
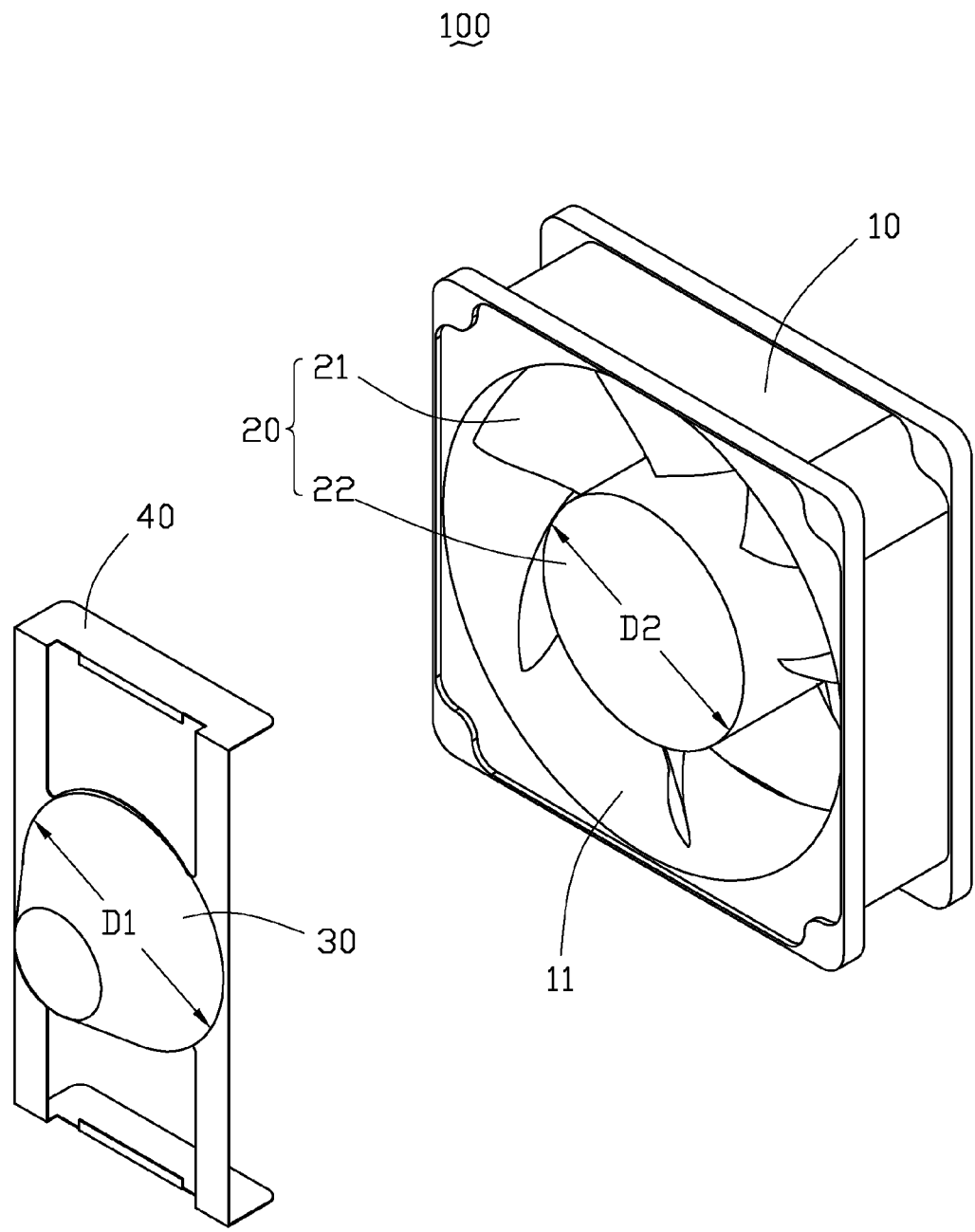
FIG. 1 is an exploded, schematic view of an exhaust fan having an air inlet side and an air outlet side according to a first exemplary embodiment.
Figure 2:
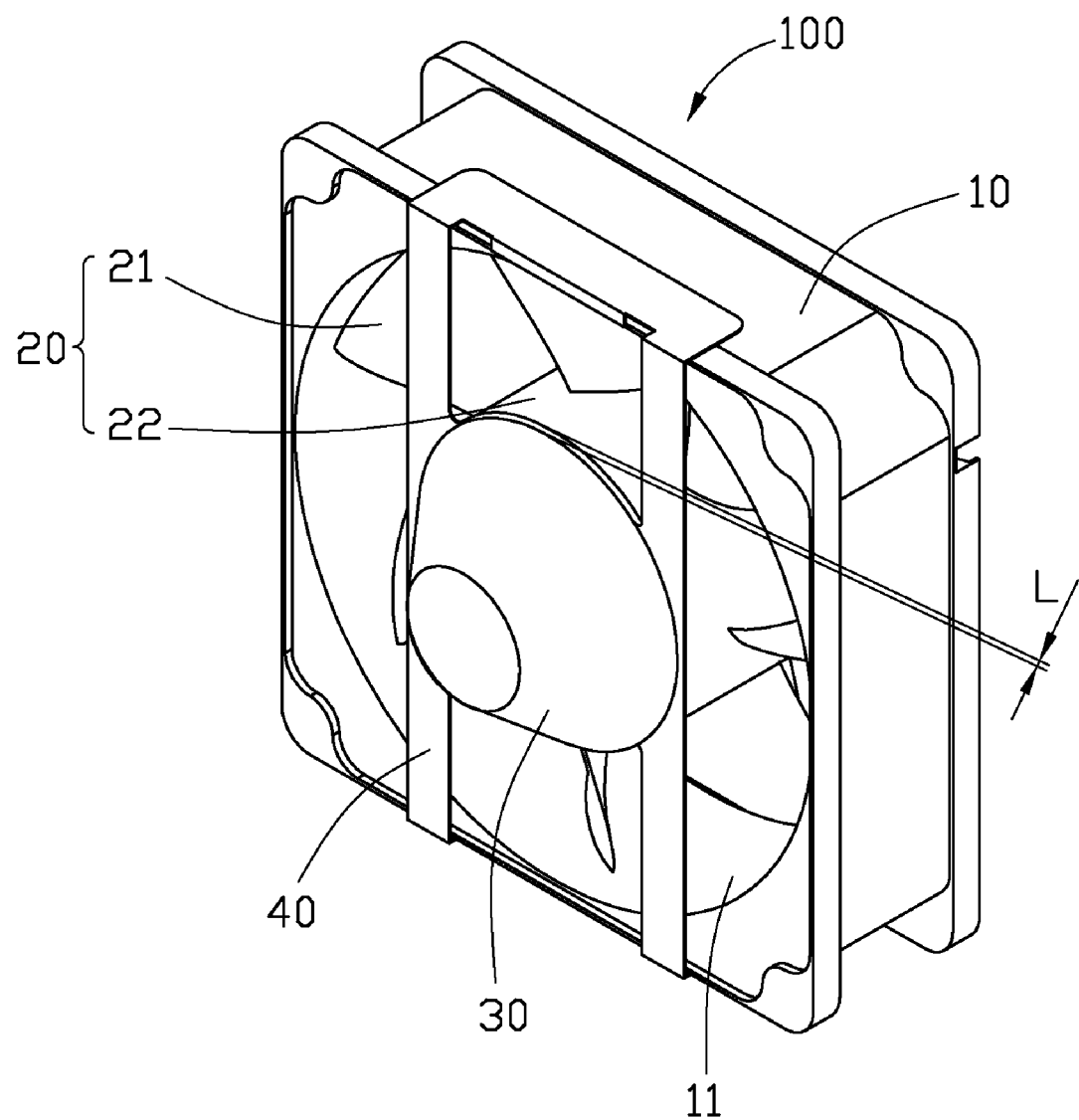
FIG. 2 is a schematic assembled view of the exhaust fan of FIG. 1, viewed from the air inlet side.
Figure 3:
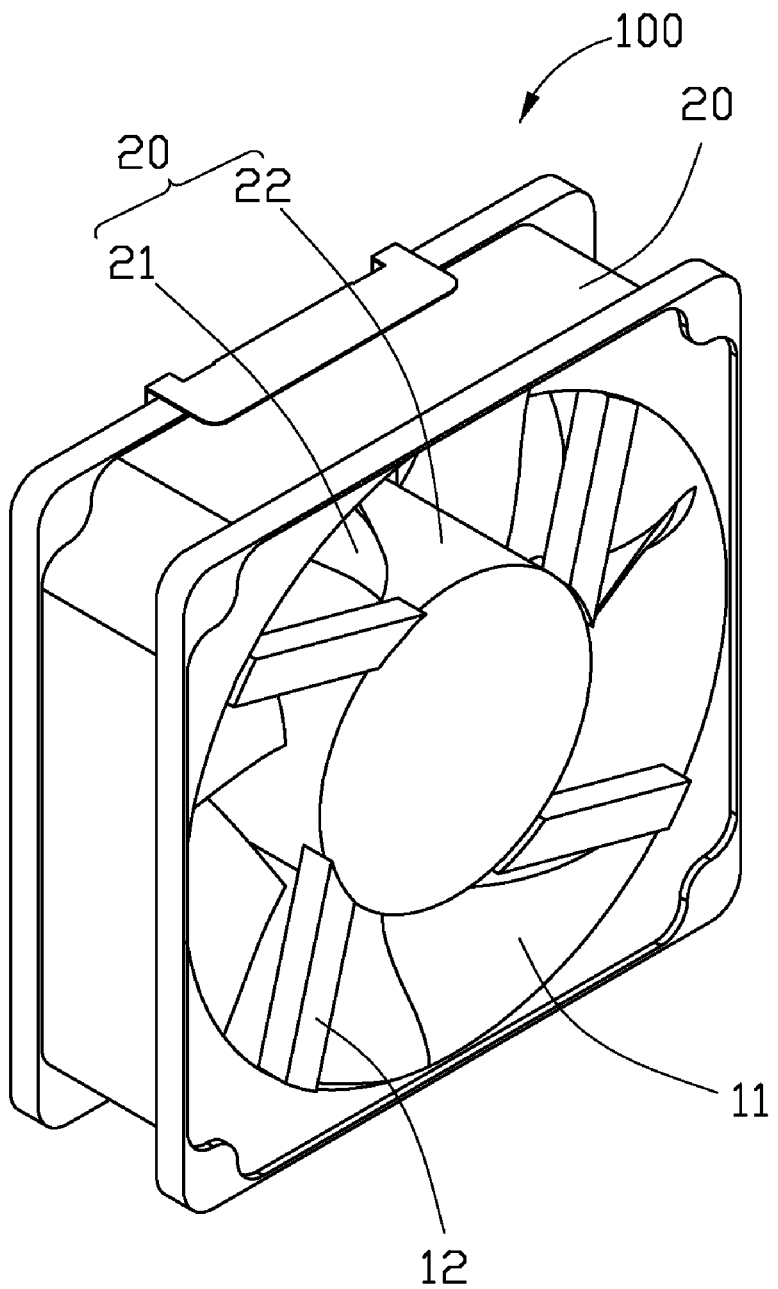
FIG. 3 is a schematic assembled view of the exhaust fan of FIG. 1, viewed from the air outlet side.

Referring to FIGS. 1 to 3, an exhaust fan 100 according to a first exemplary embodiment is shown. The exhaust fan 100 includes a fan frame 10, a fan 20, and a shielding plate 30.

The fan frame 10 defines a hollow shell 11 in the center of the fan frame 10 for receiving the fan 20 therein. The hollow shell 11 defines an airflow passage with an air inlet and an air outlet. The fan frame 10 has a number of ribs 12 extending from the surface of the shell 11 towards the center of the hollow shell 11 for mounting the fan 20. In order to prevent the fan frame 10 from deforming by exhaust air when in use, the fan frame 10 can be made of heat-resist material, such as heat-resist plastic and so on.

The fan 20 includes a hub 22 with a motor (not shown) received therein and a number of fan blades 21 extending outward in a radial direction from the circumference of the hub 22. In the present embodiment, the hub 22 is a cylinder with a diameter represented by D2.

The shielding plate 30 is disposed at the air inlet side of the exhaust fan 100 and cover an end surface of the hub 22 facing the air inlet side. The shielding plate 30 is separated from the hub 22. The outer diameter D1 of the shielding plate 30 is substantially equal to or bigger than the diameter D2 of the hub 22. In the present embodiment, the outer diameter D1 of the shielding plate 30 is substantially equal to the diameter D2 of the hub 22. The shielding plate 30 is made of a heat-resist material. The shielding plate 30 can be a flat plate, a frustum of a cone, or a cone. In order that the shielding plate 30 can also be used for guiding air flow of the exhaust fan 100, the shielding plate 30 can be a frustum of a cone or a cone.

The shielding plate 30 can be fixed to a part of an electronic device using the exhaust fan 100 or fixed to the frame 10 or the hub 22 of the exhaust fan 100. In the present embodiment, the shielding plate 30 is fixed to the frame 10 by a bracket 40. The bracket 40 has the shape of a rectangle with two transverse sides and two longitudinal sides. The two transverse sides and the two longitudinal sides of the bracket 40 corporately define a hollow receiving room. The width of the bracket 40 is substantially equal to the diameter of the shielding plate 30. Two transverse sides of the bracket 40 are secured to the frame 10 by glue etc, and the shielding plate 30 is secured at the center of the bracket 40. The distance L from the shielding plate 30 to the hub 22 is in a range from about 2 cm to about 3 cm. The shielding plate 30 can be secured to the two longitudinal sides of the bracket 40 by glue, screws and so on. In the present embodiment, the shielding plate 30 is integrally formed with the bracket 40.

The shielding plate 30 can decrease the temperature of the hub of an exhaust fan effectively. In a contrastive experiment, an exhaust fan without the shielding plate is employed inside a projector with a 100 W power light source, the temperature of the hub of the exhaust fan reaches about 75 degrees Celsius. When the exhaust fan has a shielding plate 30 inside the same projector with the 100 W power light source, the temperature of the hub of the exhaust fan is about 60-65 degrees Celsius. As a result, the life of the exhaust fan can be prolonged to about two thousand hours due to the 10-15 degrees Celsius difference.

Figure 4:
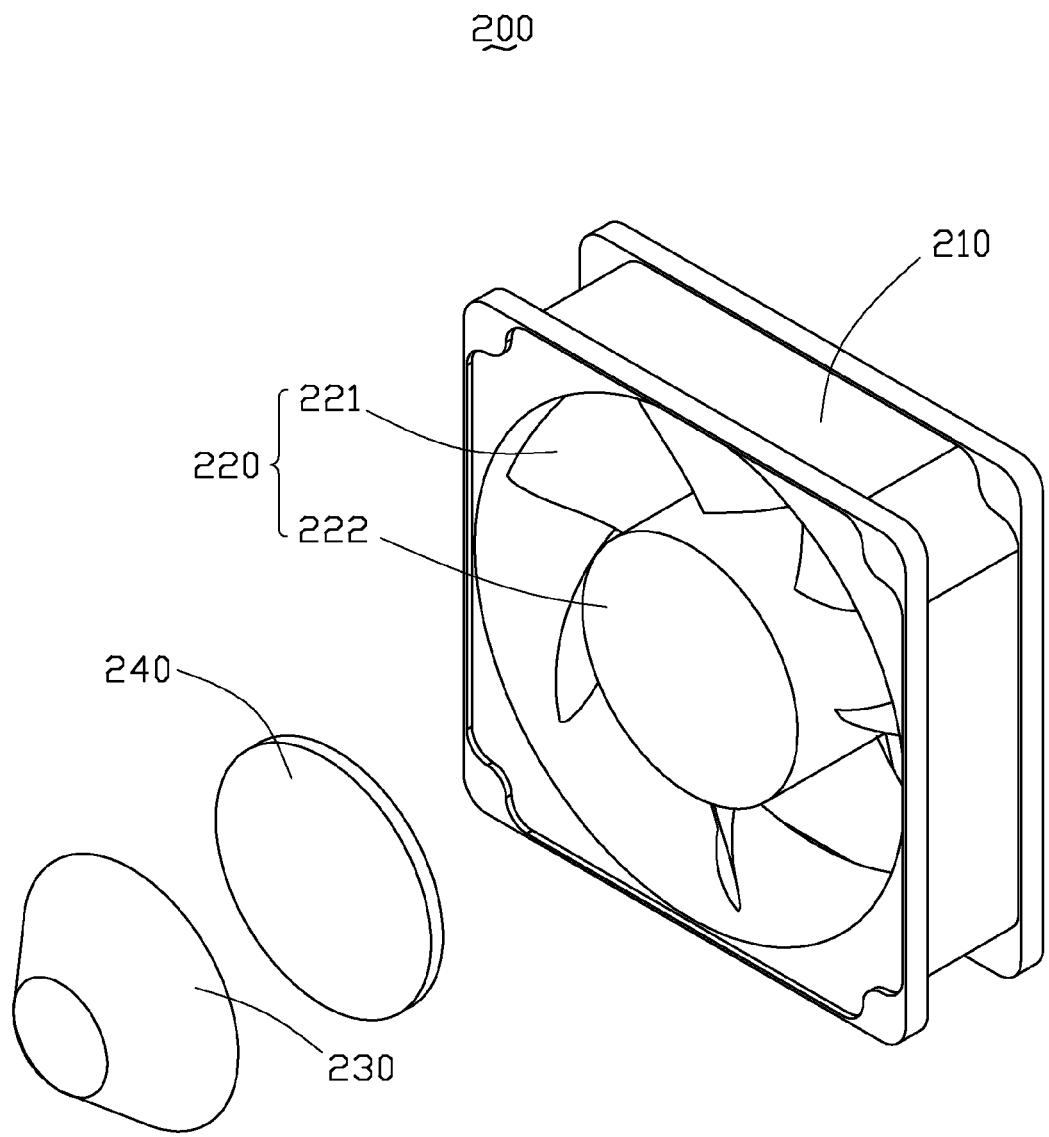
FIG. 4 is an exploded, schematic view of an exhaust fan according to a second exemplary embodiment.

Referring to FIG. 4, an exhaust fan 200 according to a second exemplary embodiment is shown. The exhaust fan 200 includes a fan frame 210, a fan 220 including a hub 222 and a number of fan blades 221, and a shielding plate 230. The exhaust fan 200 is similar to the exhaust fan 100 of the first exemplary embodiment. The difference between the exhaust fan 200 and the exhaust fan 100 is that, in the exhaust fan 200, the shielding plate 230 is fixed to the hub 222 of the fan 220 by a heat-insulating plate 240 attached to the end surface of the hub 222 facing the air inlet side. The diameter of the round plate 240 is substantially equal to or greater than that of the hub 222. The shielding plate 230 can be fixed to the heat-insulating plate 240 by glue, etc.

While certain embodiments have been described and exemplified above, various other embodiments will be apparent to those skilled in the art from the foregoing disclosure. The present invention is not limited to the particular embodiments described and exemplified, and the embodiments are capable of considerable variation and modification without departure from the scope of the appended claims.

What is claimed is:

1. An exhaust fan comprising:
   a fan frame defining a hollow shell, the hollow shell defining an air flow passage with an air inlet and an air outlet;
   a fan received in the hollow shell, the fan comprising a hub and a plurality of fan blades extending outward in a radial direction from circumference of the hub; and
   a shielding plate disposed at the air inlet side of the hub and covering an end surface of the hub facing the air inlet side, the shielding plate being separated from the hub.

2. The exhaust fan as claimed in claim 1, wherein the shielding plate is fixed to a part of an electronic device using the exhaust fan.

3. The exhaust fan as claimed in claim 1, wherein the shielding plate is fixed to the fan frame by a bracket.

4. The exhaust fan as claimed in claim 3, wherein the bracket is a rectangle with two transverse sides thereof secured to the fan frame, and the shielding plate is secured at a center of the bracket.

5. The exhaust fan as claimed in claim 3, wherein the shielding plate is integrally formed with the bracket.

6. The exhaust fan as claimed in claim 3, wherein a distance from the shielding plate to the hub is in a range from about 2 cm to about 3 cm.

7. The exhaust fan as claimed in claim 1, wherein the shielding plate is fixed to the hub by a heat-insulating plate attached to the end surface of the hub facing the air inlet side.

8. The exhaust fan as claimed in claim 1, wherein the shielding plate is a flat plate, a frustum of a cone or a cone.

9. The exhaust fan as claimed in claim 1, wherein an outer diameter of the shielding plate is equal to or bigger than the diameter of the hub.

10. The exhaust fan as claimed in claim 1, wherein the shielding plate is made of a heat-resist material.

11. An exhaust fan comprising:
    a fan frame defining a flow passage with an air inlet and an air outlet;
    a fan received in the flow passage, the fan comprising a hub and a plurality of fan blades extending outward in a radial direction from circumference of the hub; and
    a shielding plate covering an end surface of the hub facing the air inlet side of the exhaust fan, the shielding plate being heat insulated from the hub.

12. The exhaust fan as claimed in claim 11, wherein the shielding plate is fixed to a part of an electronic device using the exhaust fan.

13. The exhaust fan as claimed in claim 11, wherein the shielding plate is fixed to the fan frame by a bracket.

14. The exhaust fan as claimed in claim 13, wherein the bracket is a rectangle with two transverse sides thereof secured to the fan frame, and the shielding plate is secured at a center of the bracket.

15. The exhaust fan as claimed in claim 13, wherein the shielding plate is integrally formed with the bracket.

16. The exhaust fan as claimed in claim 13, wherein a distance from the shielding plate to the hub is in a range from about 2 cm to about 3 cm.

17. The exhaust fan as claimed in claim 11, wherein the shielding plate is fixed to the hub by a heat-insulating plate attached to the end surface of the hub facing the air inlet side.

18. The exhaust fan as claimed in claim 11, wherein the shielding plate is a flat plate, a frustum of a cone or a cone.

19. The exhaust fan as claimed in claim 11, wherein an outer diameter of the shielding plate is equal to or bigger than the diameter of the hub.

20. The exhaust fan as claimed in claim 11, wherein the shielding plate is made of a heat-resist material.

* * * * *